United States Patent
Lee et al.

(10) Patent No.: US 7,826,430 B2
(45) Date of Patent: Nov. 2, 2010

(54) METHOD AND SYSTEM FOR CONTROLLING REMOTE IN A TDD OPTICAL REPEATER

(75) Inventors: Jae-Hoon Lee, Seoul (KR); Seong-Taek Hwang, Pyeongtaek-si (KR); Byung-Jik Kim, Seongnam-si (KR); Sang-Ho Kim, Suwon-si (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 337 days.

(21) Appl. No.: 11/983,483

(22) Filed: Nov. 9, 2007

(65) Prior Publication Data

US 2008/0159743 A1    Jul. 3, 2008

(30) Foreign Application Priority Data

Jan. 3, 2007    (KR) ...................... 10-2007-0000537

(51) Int. Cl.
*H04J 3/00* (2006.01)
*H04J 3/06* (2006.01)

(52) U.S. Cl. .................. 370/337; 370/338; 370/350

(58) Field of Classification Search .................. 370/337, 370/338, 347, 350
See application file for complete search history.

(56) References Cited

U.S. PATENT DOCUMENTS

| 5,966,373 | A  | * | 10/1999 | Stephenson et al. ......... 370/335 |
| 6,043,751 | A  | * | 3/2000  | Goodwin, III .............. 340/540 |
| 2001/0031626 | A1 | * | 10/2001 | Lindskog et al. ............ 455/67.3 |
| 2003/0179730 | A1 | * | 9/2003  | Lee et al. ................... 370/329 |
| 2004/0146013 | A1 |   | 7/2004  | Song et al. |
| 2004/0164875 | A1 | * | 8/2004  | Dischert ................. 340/825.72 |
| 2005/0135811 | A1 | * | 6/2005  | Lee et al. .................... 398/139 |
| 2005/0220387 | A1 | * | 10/2005 | Asahi ............................ 385/4 |
| 2007/0255348 | A1 | * | 11/2007 | Holtzclaw .................... 607/60 |
| 2007/0275760 | A1 | * | 11/2007 | Lundh et al. ................ 455/560 |
| 2008/0002977 | A1 | * | 1/2008  | Mori ........................... 398/71 |
| 2008/0181257 | A1 | * | 7/2008  | Addy et al. ................. 370/509 |

FOREIGN PATENT DOCUMENTS

| JP | 2003-169093 | 6/2003 |
| KR | 2001-66351  | 7/2001 |
| KR | 2006-10963  | 2/2006 |
| KR | 2006-19489  | 3/2006 |
| KR | 2006-107044 | 10/2006 |

* cited by examiner

*Primary Examiner*—Andrew Lee
(74) *Attorney, Agent, or Firm*—Cha & Reiter, LLC (57) ABSTRACT

A method and apparatus for transmitting data to an Access Point (AP) and a Mobile Station (MS) in a Time Division Duplex (TDD) optical repeater. A main donor generates a control frame for controlling a remote, upon receipt of data from the AP, and transmits the control frame to the remote during a non-downlink transmission period. The remote analyzes the control frame received from the main donor, detects sync information about a downlink signal and an uplink signal, and remote control information from the analyzed control frame, performs a control operation according to the detected remote control information, and generates a status frame for notifying the main donor of the status of the remote upon receipt of data from the MS. The status frame is transmitted from the remote to the main donor during a non-uplink transmission period.

18 Claims, 6 Drawing Sheets

METHOD AND SYSTEM FOR CONTROLLING REMOTE IN A TDD OPTICAL REPEATER

CLAIM OF PRIORITY

This application claims the benefit of priority under 35 U.S.C. §119(a) from a Korean Patent Application filed in the Korean Intellectual Property Office on Jan. 3, 2007 and assigned Serial No. 2007-537, the entire disclosure of which is hereby incorporated by reference in its entirety.

BACKGROUND OF THE INVENTION

1. Field of the Invention

The present invention generally relates to optical communications and communications with one or more remote nodes. More particularly, the present invention relates to a method and system for controlling a remote node in a Time Division Duplex (TDD) optical repeater.

2. Description of the Related Art

The drastic development of computer, electronics, and communications technologies is a driving force behind the growth of a variety of wireless communication services being provided over a wireless network. The basic wireless communication service is wireless voice call service to mobile users. The wireless voice call service is typically provided irrespective of a time and location, and text service, which is supplementary to the wireless voice call service, has become increasing popular. Recently, wireless Internet service has emerged to provide wireless Internet access to mobile users.

Along with the development of the information and communications technology, $3^{rd}$ Generation (3G) International Mobile Telecommunication-2000 (IMT-2000) standardized by the International Telecommunication Union (ITU) Radio communication sector (ITU-R), such as Code Division Multiple Access (CDMA), Evolution-Data Only (EV-DO), and Wideband CDMA (WCDMA), has been deployed. IMT-2000 is a mobile communication system that aims to provide a variety of application services by enabling direct roaming all over the world. The system permits an improved degree of service, thereby permitting personal mobility and service mobility, while ensuring communication quality near or at the level of wired phones, providing high-speed packet data service, and converging wired and wireless networks. Besides increasing voice quality and Wireless Application Protocol (WAP) service quality, IMT-2000 can provide various multimedia services like Audio On Demand (AOD) and Video On Demand (VOD) at higher rates than known by using conventional (i.e. legacy) mobile communication systems.

Moreover, legacy mobile communication systems have limitations in their effectiveness in providing ultra high-speed wireless Internet service because of high wireless Internet fees incurred by the high cost of installing Base Stations (BSs), as well as the limited content generally available for display by the relatively small-size screens of mobile terminals. Wireless Local Area Network (WLAN) is not feasible for providing public service due to propagation interference and narrow coverage. In this context, Wireless Broadband (WiBro) and $4^{th}$ Generation (4G) wireless mobile communications have been proposed to provide the ultra high-speed wireless Internet service at a significantly lower price than known before, while ensuring portability and mobility.

Compared to CDMA and WCDMA, WiBro and 4G wireless mobile communications use a mobile Internet technology that adopts Time Division Duplexing (TDD) as a duplexing scheme and Orthogonal Frequency Division Multiplexing (OFDM) as a modulation scheme.

TDD is a bi-directional transmission scheme in which downlink transmission alternates with uplink transmission in time. TDD offers higher transmission efficiency than, for example, Frequency Division Duplex (FDD) that uses two different frequencies for the downlink and the uplink. TDD is also suitable for asymmetric or bursty application services through a dynamic time slot allocation. Orthogonal Frequency Division Multiple Access (OFDMA)/Time Division Multiple Access (TDMA) is a similar multiple access scheme to TDMA. which allocates all the subcarriers of a total frequency band to one user during a given time period, and then subsequently allocates them to another user during a next time period. OFDMA/TDMA advantageously increases the data rate per bandwidth and prevents multipath interference.

Typically, a mobile communication system divides a mobile communication service area into a plurality of cells and installs a BS at the center of each cell by introducing the concept of frequency reuse in order to expand the coverage area of a mobile communication network. The radiuses of the cells depend on the strength of signals and/or the amount of traffic in the cells. In other words, a cell radius is relatively smaller in a downtown area having a relatively large amount of traffic, whereas a cell radius is relatively larger in a suburban area with a relatively small amount of traffic, so that the traffic does not exceed the processing capacities of wireless BSs that provide mobile communication services to the cells.

Despite these efforts to provide better mobile communication services through the appropriate control of cell radiuses according to frequency reuse and the quantity of traffic therein, there still exists some limitations such as shadowing, in which there are areas where wireless signals cannot propagate, such as underground, the inside of buildings, tunnels, etc. in a downtown area. Installing a plurality of new wireless BSs to overcome shadowing in the shadowing area is neither cost-effective due to the costs of installing, maintaining and repairing such facilities in each of the shadowing areas, is generally unfavorable to cell design. As a solution to the problem of shadowing, mobile communication services can be provided in areas such as underground, the inside of buildings, tunnels, etc. using an optical repeater system in the shadowing area. The optical repeater system typically overcomes the shadowing by transmitting signals on a communication channel allocated to a mother BS from an optical repeater in an optical transmission scheme.

In particular, the use of an optical repeater is preferable to the 3G mobile communication system and the WiBro system, which have small cell radiuses because these systems use high frequencies and thus experience a large path loss, a small diffraction effect, and a large building transmission loss, compared to the $2^{nd}$ Generation (2G) mobile communication system.

In order to relay a radio signal between a BS and a Mobile Station (MS), the optical repeater should distinguish a downlink signal from an uplink signal. In FDD, the optical repeater identifies the downlink signal and the uplink signal by means of a duplexer, whereas in TDD, it distinguishes the downlink signal from the uplink signal by use of a switch and selectively provides a path for each of the signals. For this purpose, the TDD optical repeater needs a control signal for accurately detecting the starting points of the downlink signal and the uplink signal, switching on/off the switch for the signals, and thus changing a signal path. The TDD optical repeater, which is typically located in or near the area where there is a shadowing problem, can receive the control signal from the BS by an optical cable.

Moreover, the TDD optical repeater should be equipped with a function for generating a switching control signal so as to control the switch by analyzing a transmission frame so that switching can occur between a downlink period and an uplink period. Due to signal transmission through the optical cable, the optical repeater may suffer from time delay during the transmission. Unless the switch control signal is compensated for the time delay of the optical cable, the switch control signal becomes inaccurate, making it difficult to accurately distinguish between the downlink signal and the uplink signal.

One solution to the time delay can be found, for example, in a Korean Patent Publication No. 2006-0010963 entitled "Method and System for Generating Switching Timing Signal for Separating Transmitting and Receiving Signal in Optical Repeater of Mobile Telecommunication Network Using TDD and OFDM Modulation".

Figure 1:
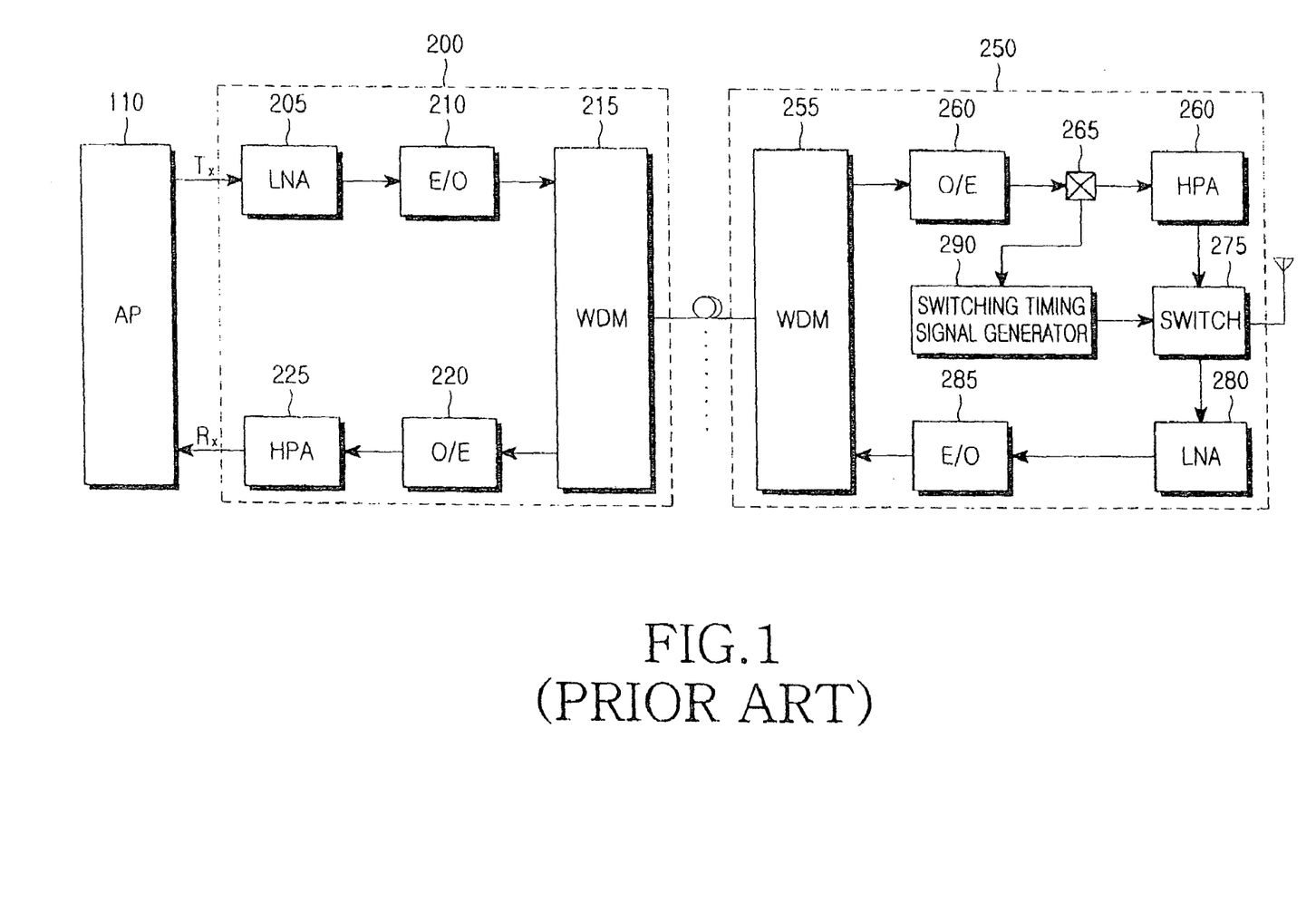
FIG. 1 is a block diagram of a conventional TDD optical repeater.

FIG. 1 is a block diagram of a conventional TDD optical repeater. Such repeaters can include a "donor" or "donor unit" and a "remote" or "coverage unit" which can bring wireless signals into a shadowing area such as a tunnel or inside a large building and distribute the signal where reception is needed.

Referring to FIG. 1, in TDD, a main donor 200 transmits a downlink signal to a remote 250 during a predetermined time period and the remote 250 transmits an uplink signal to the main donor 200 during a time period without any downlink signal.

Figure 2:
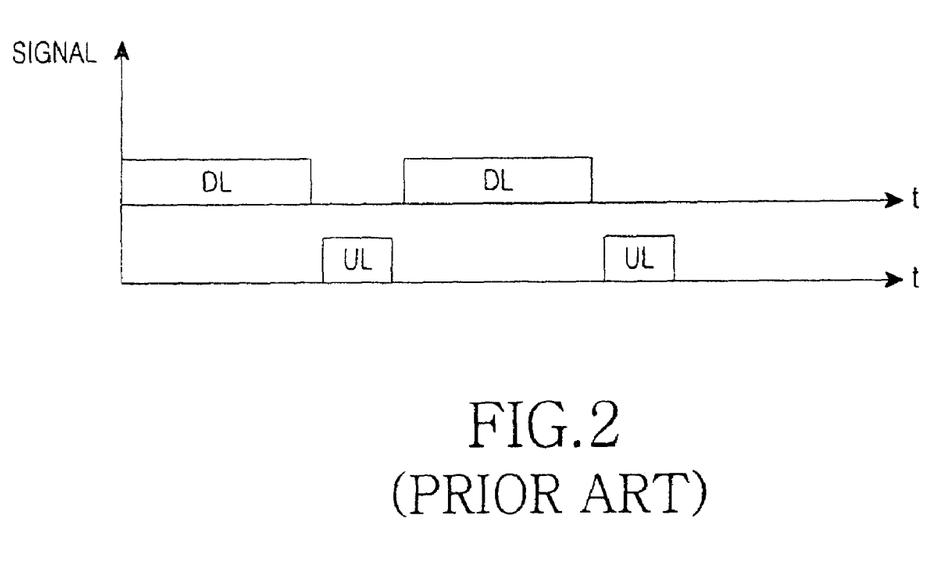
FIG. 2 is a timing diagram illustrating the timings of transmitting a downlink signal and an uplink signal in the conventional TDD optical repeater.

FIG. 2 is a timing diagram illustrating the timings of transmitting the downlink signal and the uplink signal in the conventional TDD optical repeater.

Referring to FIG. 2, during an optical downlink signal transmission via an optical fiber, optical uplink signal transmission does not occur. In other words, the transmissions are mutually exclusive of each other. Because the downlink transmission and the uplink transmission are carried out in TDD, the optical downlink and uplink signals are both transmitted in the same manner, as opposed to, for example, a system where the downlink and the uplink transmissions are transmitted in a different manner.

Now referring back to FIG. 1, upon the generation of a downlink signal at a predetermined time in an Access Point (AP) 110, the downlink signal is amplified in a Low Noise Amplifier (LNA) 205 and converted into an optical signal through electrooptic conversion in an Electro-Optic (E/O) converter 210. The optical signal is transmitted to the remote 250 through a Wavelength Division Multiplexer (WDM) 215 via an optical fiber. For distinguishing an optical downlink signal from an optical uplink signal, wavelength division multiplexing is used.

Upon receipt of the optical downlink signal in the remote 250, an Opto-Electric (O/E) converter 260 converts the optical downlink signal into an electrical signal after processing in a WDM 255. A separator 265 separates the signal so that a portion goes to switching timing signal generator 290 and a portion to High Power Amplifier (HPA) 260. A switch 275, which receives the timing signal generator by generator 290 and the amplified signal from HPA 260 switches the electrical signal to an antenna according to a switching timing signal generated from a switching timing signal generator 290.

Upon receipt of an uplink signal received through the antenna at a predetermined time, the switch 275 switches the uplink signal to an LNA 280 and an E/O converter 285 converts the electrical signal received from the LNA 280 into an optical signal. The optical signal is transmitted to the main donor 200 via the WDMs 255 and 215. In the main donor 200, an O/E converter 220 converts the optical uplink signal to an electrical signal and a High Power Amplifier (HPA) 225 amplifies the electrical signal and transmits the amplified signal to the AP 110.

In the conventional TDD optical repeater such as shown in FIG. 1, no channel is allocated for controlling the on/off of the remote 250 or the amplifiers of the remote 250, i.e. an HPA 270 and the LNA 280 and no channel is allocated to carry information about the status of the remote 250 to the main donor 200. Therefore, the control of the remote 250 is unstable.

SUMMARY OF THE INVENTION

An aspect of exemplary embodiments of the present invention is to address at least some of the problems and/or disadvantages discussed above and to provide at least the advantages described herein below. Accordingly, an aspect of the present invention is to provide a method and system for facilitating control of a remote based on the characteristics of a TDD signal without using an additional optical transceiver in a TDD optical repeater by transmitting control information for the remote along with a downlink signal from a main donor to the remote, so that the remote extracts the control information, for control of the remote, and transmits status information about the status of the remote along with an uplink signal from the remote to the main donor.

In accordance with an aspect of the present invention, there is provided a method for transmitting data to an Access Point (AP) and a Mobile Station (MS) in a TDD optical repeater, in which a main donor generates a control frame for controlling a remote, upon receipt of data from the AP, and transmits the control frame to the remote during a non-downlink transmission period, and the remote analyzes the control frame received from the main donor, detects sync information about a downlink signal and an uplink signal and remote control information from the analyzed control frame, performs a control operation according to the detected remote control information, generates a status frame for notifying the main donor of the status of the remote, upon receipt of data from the MS, and transmits the status frame to the main donor during a non-uplink transmission period.

BRIEF DESCRIPTION OF THE DRAWINGS

The above features and advantages of certain exemplary embodiments of the present invention will be more apparent from the following detailed description taken in conjunction with the accompanying drawings, in which.

DETAILED DESCRIPTION OF THE INVENTION

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions may be omitted for clarity and conciseness to ensure appreciation of the invention by a person of ordinary skill in the art. Throughout the drawings, which are provided for illustration and do not limit the invention to the examples shown, the same drawing reference numerals will be understood to refer to the same elements, features and structures.

Figure 3:
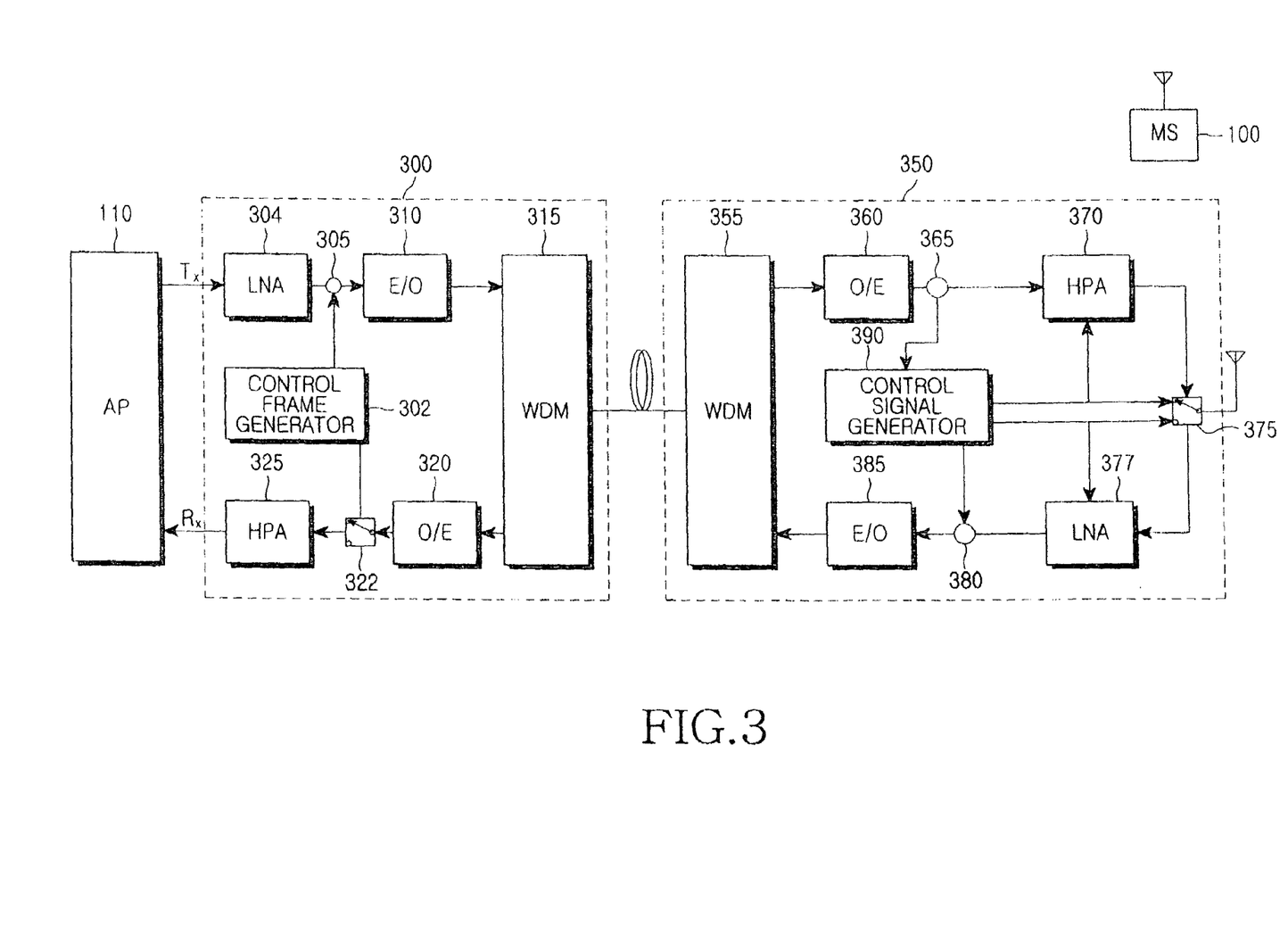
FIG. 3 is a block diagram of a TDD optical repeater according to an exemplary embodiment of the present invention.
Figure 4:
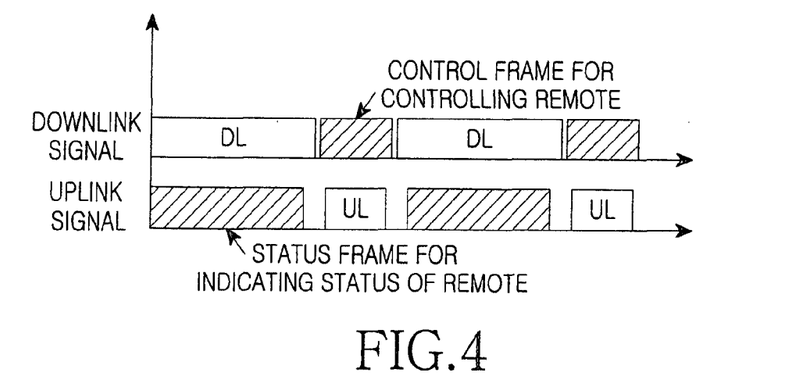
FIG. 4 is a timing diagram illustrating the timings of transmitting a downlink signal and an uplink signal in the TDD optical repeater according to an exemplary embodiment of the present invention.

FIG. 3 is a block diagram of a TDD optical repeater according to an exemplary embodiment of the present invention and FIG. 4 is a timing diagram illustrating the timings of transmitting a downlink signal and an uplink signal in the TDD optical repeater according to an exemplary embodiment of the present invention.

Referring to the example shown in FIG. 3, the TDD optical repeater may include a main donor 300 and at least one remote 350. The main donor 300 includes a control frame generator 302, an LNA 304, a first signal combiner 305, an E/O converter 310, a WDM 315, an O/E converter 320, a first switch 322, and an HPA 325.

The remote 350 includes a WDM 355, an O/E converter 360, a signal separator 365, an HPA 370, a second switch 375, an LNA 377, a second signal combiner 380, an E/O converter 385, and a control signal generator 390. The main donor 300 can be connected to a plurality of remotes 350 by optical fibers so as to expand the coverage area of the TDD optical repeater.

The main donor 300 typically communicates with the AP 110 by a transmission line $T_x$ connected there between. Upon receipt of a downlink signal from the AP 110, the main donor 300 converts the downlink signal into an optical signal by electro-optic conversion and transmits the optical signal to the remote 350 via an optical fiber. Upon receipt of an optical uplink signal from the remote 350, the main donor 300 converts the optical signal to an electrical signal through opto-electric conversion and transmits the electrical signal to the AP 110 via the transmission line.

Upon receipt of an optical downlink signal from the main donor 300, the remote 350 converts the optical signal into an electrical signal through opto-electric conversion and transmits the electrical signal to an MS 100. Upon receipt of an uplink signal from the MS 100, the remote 350 converts the uplink signal to an optical signal through electro-optic conversion and transmits the optical signal to the main donor 300 via the optical fiber.

Still referring to FIG. 3, for downlink transmissions and uplink transmissions, the above-described TDD optical repeater typically operates as follows.

In the main donor 300, the LNA 304 low-noise-amplifies a downlink signal received from the AP 110.

The control frame generator 302 generates a control frame with control information for controlling the remote 350, as illustrated in FIG. 4, and transmits the control frame to the remote 350 during an uplink transmission following the downlink transmission, i.e. a non-downlink transmission period. The control frame includes information for controlling the HPA 370 and the LNA 377 to adjust the power of an uplink signal as well as a downlink signal from the remote 350. The control frame generator 302 also generates a control frame according to a status frame with information about the status of the remote 350 received during a non-uplink transmission period after an uplink transmission from an MS.

The first signal combiner 305 combines the amplified downlink signal received from the LNA 305 with the control frame received from the control frame generator 302. The E/O converter 310 converts the combined downlink signal received from the first signal combiner 310 into an optical signal. The WDM 315 transmits a plurality of optical signals received from the E/O converter 310 to the remote 350 by WDM.

Still referring to FIG. 3, each of the WDMs 315 and 355 divides a fiberoptic channel into a plurality of channels according to light wavelengths and uses them as a plurality of communication paths. For optical signal transmission, the WDM can act as a wavelength division multiplexer that transmits signals at different light wavelengths via a single optical fiber, and for optical signal reception, it can act as a wavelength division demultiplexer that demultiplexes a signal received via a single optical fiber into signals at different wavelengths. The E/O converters 310 and 385 can be configured, for example, using laser diodes and the O/E converters 320 and 360 can be configured, for example, using photo diodes.

In the remote 350, the WDM 355 demultiplexes the received optical signal into a plurality of optical signals. The O/E converter 360 converts an optical signal into an electrical signal.

The signal separator 365 separates a control frame and a downlink signal from the electrical signal received from the O/E converter 360 and provides the control frame to the control signal generator 390 and the downlink signal to the HPA 370.

The control signal generator 390 analyzes the control frame and controls the second switch 375, the on/off of the remote 350, the HPA 370, and the LNA 377 according to the analysis result.

In addition, the control signal generator 390 typically generates a status frame with information about the status of the remote 350 for transmission to the main donor 300 during a downlink transmission following an uplink transmission from an MS, i.e. during a non-uplink transmission period.

The HPA 370 amplifies the electrically converted downlink signal to an effective predefined power level/range for transmitting the downlink signal over the air by an antenna according to HPA control information analyzed by the control signal generator 390. The second switch 375 switches on/off according to time control information $\Delta_t$ analyzed by the control signal generator 390, selectively establishes a downlink signal path, and radiates the amplified downlink signal received from the HPA 370 to an MS through an antenna.

When the remote 350 receives an uplink signal from the MS through the antenna according to remote-on/off information analyzed by the control signal generator 390, the second switch 375 switches on/off according to time control information $\Delta_t$ analyzed by the control signal generator 390 and selectively establishes an uplink signal path.

The LNA 377 amplifies the uplink signal received from the second switch 375 according to LNA control information analyzed by the control signal generator 390.

The second signal combiner 380 combines the amplified uplink signal received from the LNA 377 with a status frame generated from the control signal generator 390.

The E/O converter 385 converts the combined uplink signal to an optical signal and the WDM 355 transmits the optical signal to the main donor 300 via an optical fiber.

In the main donor 300, the WDM 315 demultiplexes the received optical signal into a plurality of optical signals. The O/E converter 320 converts an optical signal to an electrical signal.

The first switch 322 selectively establishes an uplink signal path to provide the uplink signal to the HPA 325, or provides the status frame received during the non-uplink transmission period to the control frame generator 302.

The HPA 325 amplifies the uplink signal to an effective power level for transmitting the uplink signal to the AP 110, and transmits it to the AP 110.

Figure 5:
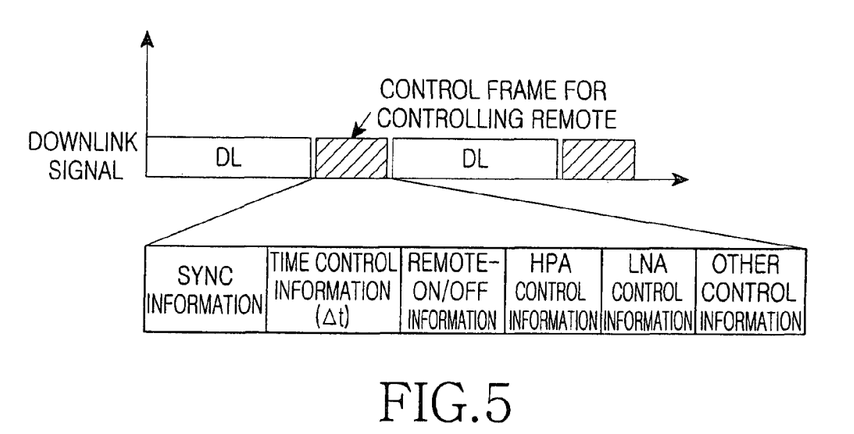
FIG. 5 illustrates the format of a control frame by which a main donor controls a remote according to an exemplary embodiment of the present invention.
Figure 6:
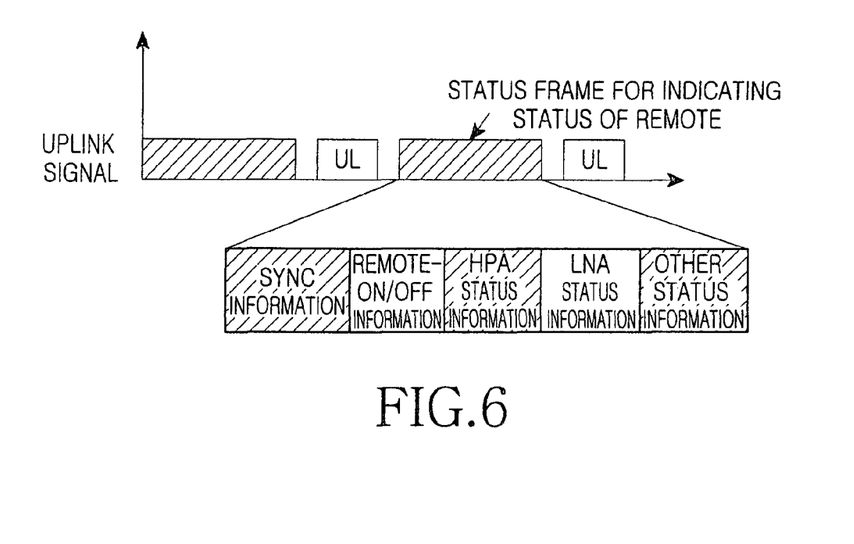
FIG. 6 illustrates the format of a status frame by which the remote notifies the main donor of its status according to an exemplary embodiment of the present invention.

FIG. 5 illustrates the exemplary format of a control frame by which the main donor 300 typically controls the remote according to an exemplary embodiment of the present invention and FIG. 6 illustrates the exemplary format of a status frame by which the remote 350 typically notifies the main donor 300 of its status according to an exemplary embodiment of the present invention.

Referring to FIG. 5, the control frame for controlling the remote 350 includes Sync information for synchronizing between the main donor 300 and the remote 350 with respect to the a downlink signal and an uplink signal, time control information $\Delta_t$, remote-on/off information, HPA control information, and LNA control information. The control frame may further include other control information and has every time information required for TDD operation.

Referring to FIG. 6, the status frame indicating the status of the remote 350 includes Sync information for synchronizing between the main donor 300 and the remote 350 with respect to a downlink signal and an uplink signal, remote-on/off status information, HPA status information, and LNA status information. The control frame may further include other status information according to need.

Figure 7:
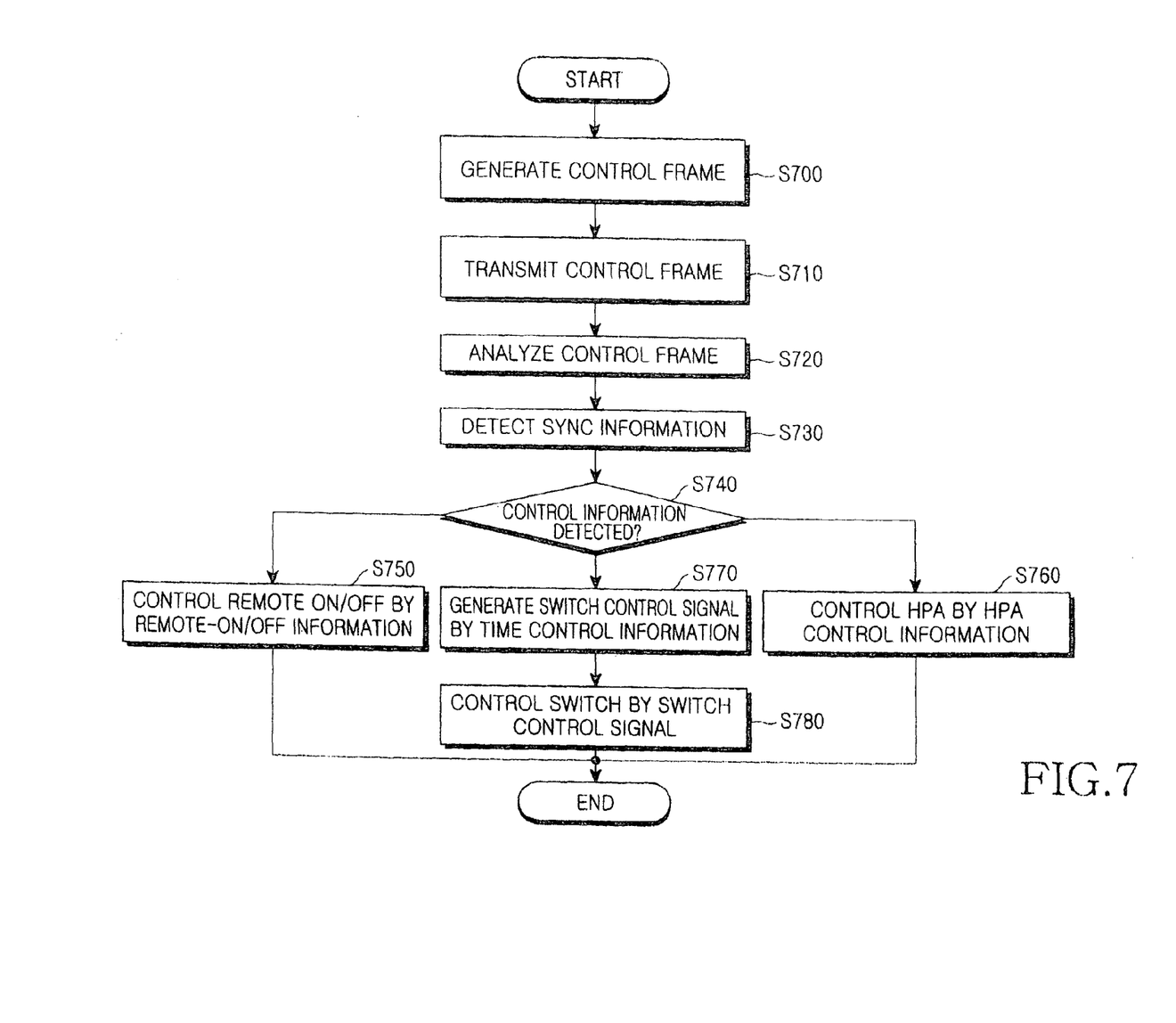
FIG. 7 is a flowchart illustrating a method for controlling the remote with respect to a downlink signal in the TDD optical repeater according to an exemplary embodiment of the present invention.

FIG. 7 is a flowchart illustrating exemplary method steps for controlling the remote with respect to a downlink signal in the TDD optical repeater according to an exemplary embodiment of the present invention.

Referring to FIG. 7, upon receipt of a downlink signal from the AP 110 at the main donor 300 of the TDD optical repeater, the control frame generator 302 generates a control frame for controlling the remote 350 in step S700 and the main donor 300 transmits the control frame to the remote 350 during an uplink transmission following the downlink transmission from the AP 110, i.e. during a non-downlink transmission period in step S710.

The control signal generator 390 of the remote 350 analyzes the control frame received from the main donor 300 in step S720 and detects Sync information for synchronizing between the main donor 300 and the remote 350 with respect to a downlink signal and an uplink signal in step S730. Subsequently, the control signal generator 390 detects time in step S740 for control information $\Delta_t$ for generating a switch control signal and then acts according to the type of control information detected.

In step S750, when detecting remote-on/off information from the control frame, the control signal generator 390 controls the on/off of the remote 350 according to the remote-on/off information.

In step S760, when detecting HPA control information, the control signal generator 390 controls the HPA 370 to amplify the downlink signal to an effective power level for radio transmission according to the HPA control information. In step S770, when detecting time control information $\Delta_t$ for controlling a switching timing, the control signal generator generates a switch control signal according to the time control information $\Delta_t$ and controls the second switch 375 to establish a downlink signal path according to the switch control signal in step S780.

The second switch 375 establishes the downlink signal path by switching on according to the switch control signal and only a downlink signal free of the control frame is transmitted through the antenna for transmission to the MS 100.

Figure 8:
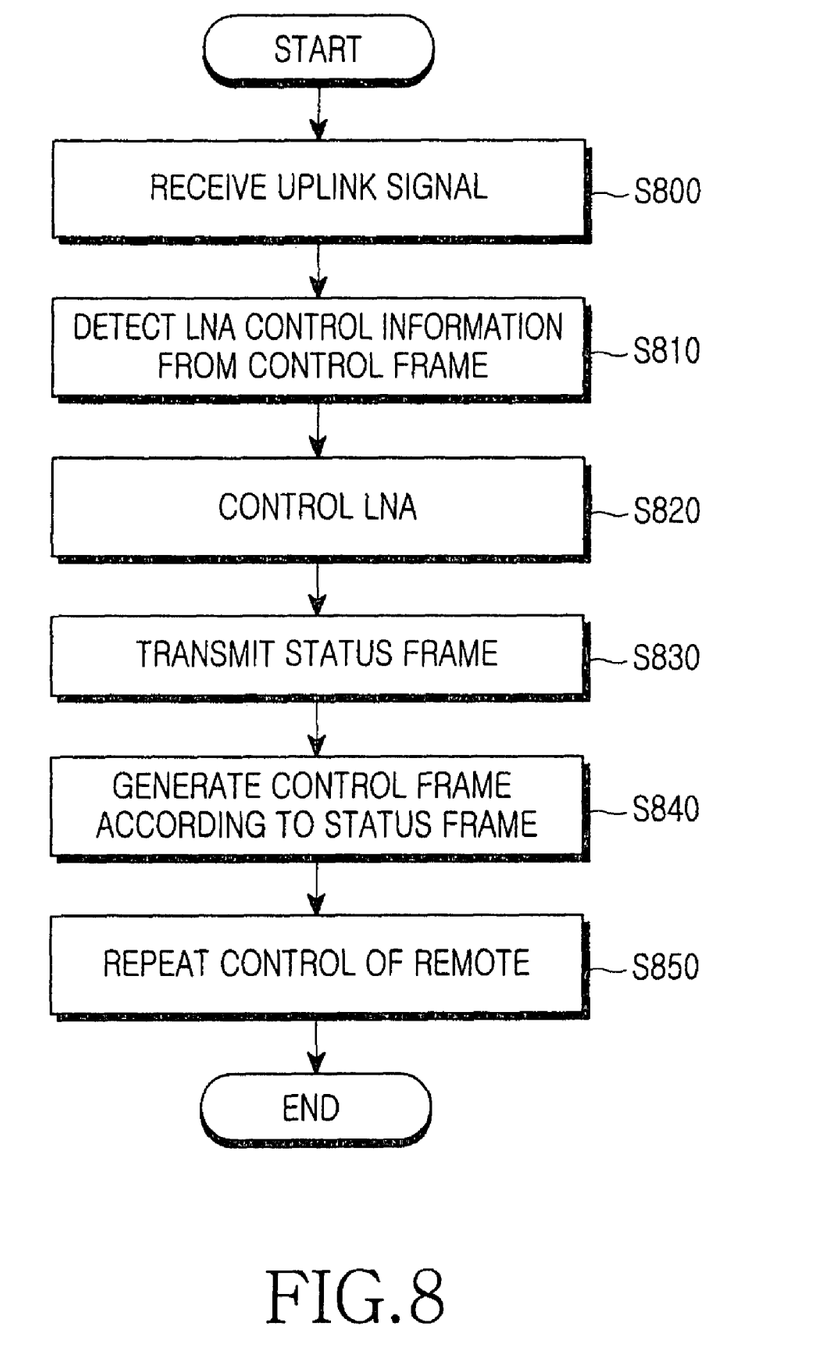
FIG. 8 is a flowchart illustrating a method for controlling the remote with respect to an uplink signal in the TDD optical repeater according to an exemplary embodiment of the present invention.

FIG. 8 is a flowchart illustrating exemplary method steps for controlling the remote with respect to an uplink signal in the TDD optical repeater according to an exemplary embodiment of the present invention.

Referring to FIG. 8, the second switch 375 of remote 350 establishes an uplink signal path by switching on according to a switch control signal. Upon receipt of an uplink signal from an MS 100 through the antenna in step S800, the control signal generator 390 detects LNA control information from control information about the remote 350 in step S810 and controls the LNA 377 to amplify an uplink signal component according to the LNA control information in step S820.

Meanwhile, at step S830, the control signal generator 390 generates a status frame indicating the status of the remote 350, including Sync information for synchronizing between the main donor 300 and the remote 350 with respect to a downlink signal and an uplink signal, remote-on/off status information, HPA status information, and LNA status information, and transmits the status information to the main donor 300 during a non-uplink transmission period.

In step S840, the control frame generator 302 of the main donor 300 controls the first switch 322 to establish an uplink signal path, receives the status frame from the control signal generator 390, and generates a control frame using the status frame. Then in step S850, the control signal generator 390 repeats the control procedure of the remote 350.

In accordance with the present invention as described in the above examples, a remote can be easily controlled in a TDD optical repeater since control information for controlling the remote and status information about the remote are transmitted by the respective main donor 300 and remote 350 in time areas unused by the respective main donor and remote for TDD signal transmission.

While the invention has been shown and described with reference to certain exemplary embodiments of the present invention thereof, it will be understood by those skilled in the art that various changes in form and details may be made therein without departing from the spirit of the present invention and the scope of the appended claims. For example, while the main donor 300 shows a transmission line and reception line between the AP 110 and the main donor 300, it is within the spirit and scope of the invention that such transmission could be wireless.

What is claimed is:

1. A method for transmitting data to an Access Point (AP) and a Mobile Station (MS) in a Time Division Duplex (TDD) optical repeater, comprising:
   (a) generating a control frame by a main donor for controlling a remote, upon receipt of data from the AP, and transmitting the control frame downstream to the remote by the main donor during a non-downlink transmission period in which the MS is otherwise permitted exclusive uplink transmission to the AP via TDD protocol;

(b) analyzing, by the remote, the control frame received from the main donor;

(c) detecting, by the remote, sync information about a downlink signal and an uplink signal and remote control information from the analyzed control frame in step (b); and (d) performing, by the remote, a control operation according to the detected remote control information.

2. The method of claim 1, further comprising the remote generating a status frame for notifying the main donor of the status of the remote, upon receipt of data from the MS, and transmitting the status frame to the main donor by the remote during a non-uplink transmission period in which the AP is otherwise permitted exclusive downlink transmission to the MS via TDD protocol.

3. The method of claim 2, wherein the status frame transmitted by the remote includes sync information for synchronizing a downlink signal and an uplink signal, a remote on/off status information, a High Power Amplifier (HPA) status information, and a Low Noise Amplifier (LNA) status information.

4. The method of claim 1, wherein the control operation in step (d) comprises, when a remote on/off information is detected by the remote from the remote control information, controlling a power-on/off of the remote according to the remote on/off information.

5. The method of claim 1, wherein the control operation in step (d) comprises, when HPA control information is detected from the remote control information, the main donor controlling an HPA to amplify a downlink signal to a power level sufficient for transmitting the downlink signal wirelessly according to the HPA control information.

6. The method of claim 5, wherein the HPA control information controls the HPA to amplify the power level of the downlink signal within a predetermined range for wireless transmission to the MS.

7. The method of claim 1, wherein the control operation comprises controlling a switch to establish a downlink and uplink signal path by the remote, when time control information is detected from the remote control information, by generating a switch control signal according to the detected time control information.

8. The method of claim 1, wherein the control operation comprises, upon receipt of data from the MS, detecting LNA control information from the remote control information by the remote and controlling an LNA to amplify an uplink signal component according to the LNA control information.

9. The method of claim 1, wherein the control frame generated in step (a) includes sync information for synchronizing a downlink signal and an uplink signal, time control information for controlling a switching timing, remote on/off information, HPA control information, and LNA control information.

10. The method of claim 1, further comprising demultiplexing by the main donor a received optical uplink signal from at least one of said remote into a plurality of optical signals.

11. An apparatus for transmitting data to an Access Point (AP) and a Mobile Station (MS) in a Time Division Duplex (TDD) optical repeater, comprising:

a remote;

a main donor in communication with said remote, said main donor comprising a control frame generator for generating a control frame for controlling the remote upon receipt of a downlink data signal from the AP, and for transmitting the control frame to the remote during a non-downlink transmission period in which the MS is otherwise permitted exclusive uplink transmission to the AP via TDD protocol; and wherein said remote comprising control signal analyzer/generator for analyzing the control frame generated by the control frame generator and received from the main donor, a control signal generator for performing a control operation according to the analyzed control frame, for generating a status frame for notifying the main donor of a status of the remote, and for transmitting the status frame to the main donor during a non-uplink transmission period in which the AP is otherwise permitted exclusive downlink transmission to the MS via TDD protocol.

12. The apparatus of claim 11, wherein the main donor comprises an electrical to optical converter for converting the downlink signal from the AP and control information output from the control frame generator into an optical signal for optical transmission to the remote, and an optical to electrical converter for converting an optical signal received from the remote to an electrical uplink signal means for transmitting the uplink signal to the AP.

13. The apparatus of claim 12, wherein the main donor further comprises a Low Noise Amplifier (LNA) for amplifying the downlink signal received from the AP, a first signal combiner for combining the amplified downlink signal with the control frame received from the control generator, a Wavelength Division Multiplexer (WDM) for multiplexing the optical signal output from said electrical to optical converter, a first switch for providing a first path for the status frame from the remote to the control frame generator, and a High Power Amplifier (HPA) for amplifying the electrically converted uplink signal provided by a second path of the first switch.

14. The apparatus of claim 13, wherein the HPA amplifies the uplink signal to a power level sufficient for reception by the AP.

15. The apparatus of claim 13, wherein the WDM in the main donor demultiplexing a received optical signal into a plurality of optical signals.

16. The apparatus of claim 12, wherein the remote comprises an O/E converter for converting an optical signal received from the main donor into an electrical downlink signal for transmission to the MS, and an E/O converter for converting an uplink signal received from the MS into an optical signal for transmission to the main donor.

17. The apparatus of claim 16, wherein the remote further comprises a WDM for transmission of the optically converted uplink signal to the WDM of the main donor, a signal separator for separating a control frame from a downlink signal received from the O/E converter in said remote, an HPA for amplifying the downlink signal received from the signal separator, a second switch for providing a downlink signal path for transmission to the MS, and for providing an uplink signal path from the MS, an LNA for providing low noise amplification for the uplink signal received from the second switch, and a second signal combiner for combining an uplink signal received from the LNA with the status frame generated from the control signal generator.

18. The apparatus of claim 17, wherein the signal separator separates the control frame from the downlink signal received from the O/E converter and for transmitting the control frame to the control signal generator.

* * * * *